US012125509B1

(12) United States Patent
Contreras et al.

(10) Patent No.: US 12,125,509 B1
(45) Date of Patent: Oct. 22, 2024

(54) DARK LASER HEATING BY POSITIVE PULSE BIASING IN HEAT ASSISTED MAGNETIC RECORDING

(71) Applicant: Western Digital Technologies, Inc., San Jose, CA (US)

(72) Inventors: John T. Contreras, Palo Alto, CA (US); Sukumar Rajauria, San Jose, CA (US); Rehan Zakai, San Ramon, CA (US); Joey M. Poss, Rochester, MN (US); Xinzhi Xing, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/483,595

(22) Filed: Oct. 10, 2023

(51) Int. Cl.
    *G11B 7/126* (2012.01)
    *G11B 5/02* (2006.01)
    *G11B 5/00* (2006.01)

(52) U.S. Cl.
    CPC ............ *G11B 7/126* (2013.01); *G11B 5/02* (2013.01); *G11B 2005/0021* (2013.01)

(58) Field of Classification Search
    CPC .... G11B 7/126; G11B 5/02; G11B 2005/0021
    See application file for complete search history.

(56) References Cited

U.S. PATENT DOCUMENTS

| | | | |
|---|---|---|---|
| 8,310,902 B1 * | 11/2012 | Contreras | G11B 20/1024 360/59 |
| 8,553,506 B2 * | 10/2013 | Contreras | G11B 5/314 369/13.13 |
| 9,019,646 B2 * | 4/2015 | Rausch | G11B 5/6088 360/59 |
| 9,916,851 B1 * | 3/2018 | Seigler | G11B 5/02 |
| 10,192,578 B1 | 1/2019 | Macken et al. | |
| 10,540,998 B2 | 1/2020 | Tatah et al. | |
| 10,580,446 B1 * | 3/2020 | Wessel | G11B 5/02 |
| 2013/0170331 A1 | 10/2013 | Contreras et al. | |
| 2014/0301173 A1 * | 10/2014 | Kuehlwein | G11B 5/02 369/13.26 |

OTHER PUBLICATIONS

Yin et al., Heat Source Analysis of Hard Disk Drives with Different Wall Conditions using Infrared System, Jan. 2011, Engineering, Retrieved from https://www.researchgate.net/publication/267218149_Heat_Source_Analysis_of_Hard_Disk_Drives_with_Different_Wall_Conditions_using_Infrared_System.

* cited by examiner

*Primary Examiner* — Andrew Sasinowski
(74) *Attorney, Agent, or Firm* — Neugeboren O'Dowd PC

(57) ABSTRACT

Various illustrative aspects are directed to a data storage device comprising a disk; a read/write head configured to read data from and write data to the disk; a laser diode configured to heat an area of the disk near the read/write head; and one or more processing devices configured to preheat the laser diode to a target temperature associated with a write operation, wherein the preheating comprises applying (e.g., using a preamplifier) at least one forward bias pulse to the laser diode, wherein a corresponding duration of the at least one forward bias pulse is shorter than a duration of a turn-on delay for the laser diode; and initiate a write operation for writing data to the disk, based at least in part on the preheating.

20 Claims, 11 Drawing Sheets

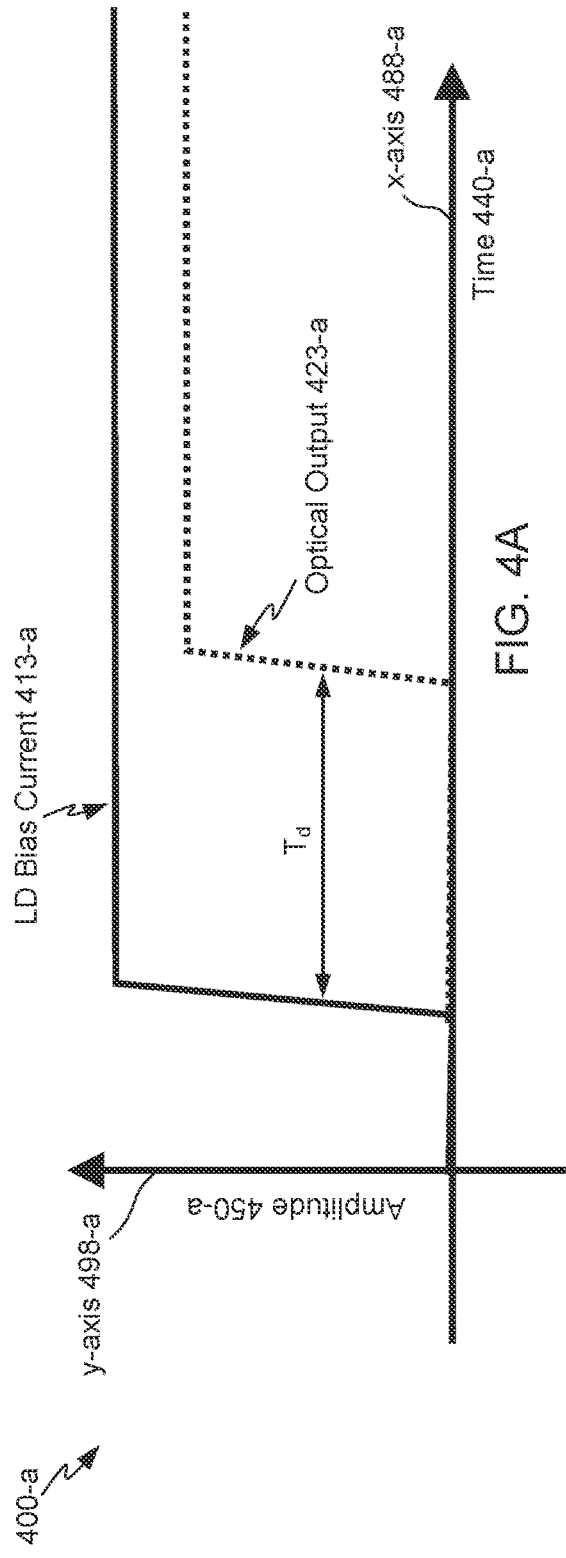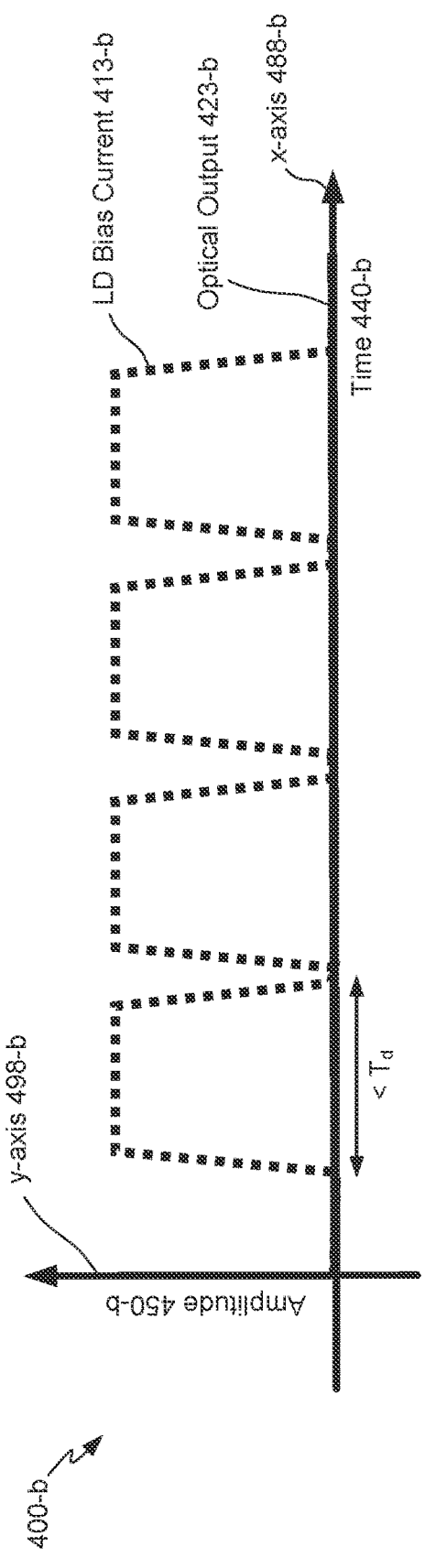
FIG. 4A
FIG. 4B

DARK LASER HEATING BY POSITIVE PULSE BIASING IN HEAT ASSISTED MAGNETIC RECORDING

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A is a conceptual diagram of a prior art disk format 2 comprising a number of radially-spaced, concentric servo tracks 4 defined by servo wedges $6_0$-$6_N$ recorded around the circumference of each servo track. A plurality of concentric data tracks are defined relative to servo tracks 4, wherein the data tracks may have the same or a different radial density (e.g., tracks per inch (TPI)) than servo tracks 6. Each servo wedge $6_i$ comprises a preamble 8 for storing a periodic pattern, which allows proper gain adjustment and timing synchronization of the read signal, and a synchronization mark 10 (sync mark 10) for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head positioning information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to one or more actuators to actuate the head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects and/or embodiments disclosed herein. It should not be considered an extensive overview relating to all contemplated aspects and/or embodiments, nor should it be regarded to identify key or critical elements relating to all contemplated aspects and/or embodiments or to delineate the scope associated with any particular aspect and/or embodiment. Accordingly, the following summary has the sole purpose of presenting certain concepts relating to one or more aspects and/or embodiments relating to the mechanisms disclosed herein in a simplified form to precede the detailed description presented below.

Some disk drives employ heat-assisted magnetic recording (HAMR) by using a laser diode to briefly reduce the coercivity of the disk's magnetic material, which allows for denser data writing. In some cases, however, laser diodes (LDs) in HAMR drives are susceptible to temperature-induced mode hopping, for instance, during the start of a write operation, seeking between tracks, servo sector or servo wedge crossings, etc. For example, during HAMR write, the temperature of an LD may increase (e.g., by 10-20 degrees C.), and several mode hop critical temperatures may be crossed during this temperature transient. In some circumstances, one or more mode hop events may be triggered during this transient phase, which may adversely impact write performance. In some instances, mode hop events during a HAMR write operation may result in recording non-uniformities, which degrades HAMR recording performance.

Thus, HAMR drives face the issue of "mode hopping," where temperature changes in the LD cause it to switch between different lasing modes, leading to variations in output power and wavelength. This can cause inconsistent heating applied to the media, compromise the reliability of data recording, and reduce heating effectiveness if the new wavelength mismatches the HAMR head's settled wavelength after switching to write mode. Hence, effective temperature management of the laser diode is crucial for reliable HAMR data writing operation.

A technique referred to as dark laser heating "DLH" may be employed to preheat a LD to a target or steady state temperature prior to a write operation. In such cases, the LD consumes power and generates heat without significantly emitting photons, the particles responsible for light emission. Some techniques implement DLH by driving the LD using a reverse bias voltage level that is at or near the reverse break-down voltage, where the laser conducts current but does not emit light. By operating in this break-down voltage region, the LD predominantly performs as a traditional diode, converting the electrical power it receives into heat instead of light. This allows the LD to warm up to a specific temperature without substantial light emission, hence the term "dark" laser heating. In other DLH techniques, the LD may be preheated via application of this reverse bias (e.g., at or near the reverse or avalanche breakdown voltage) to the LD. However, DLH using a reverse bias often requires a large negative bias voltage (e.g., below −15 volts, −17 volts, −20 volts, to name a few non-limiting examples) which may require hardware modifications, such as high-voltage integrated circuits (ICs) to buffer and control the reverse bias applied to the LD.

Broadly, aspects of the present disclosure are directed to preheating an LD to a target temperature (e.g., steady state temperature associated with a write operation) using a novel DLH technique, as further described below.

In accordance with aspects of the present disclosure, the LD may be preheated to a temperature that is at or near the steady state temperature associated with the write operation using positive/forward bias pulses, herein referred to as DLH-pulse bias. The duration or width of the forward bias pulses may be selected to be lower than a turn-on time delay ($\tau$) of the LD, which prevents the LD from producing an optical output. In some cases, the techniques described herein can be implemented using existing preamp IC technology with minimal hardware modifications, further described below in relation to FIGS. 1B and 1C. Furthermore, preheating the LD using forward bias pulses that have a duration less than a turn-on delay threshold (e.g., <3 nanoseconds (ns)) may serve to prevent an optical output response from the LD, which in turn can help minimize or reduce the risk of data erasure/degradation. In some cases, the optical turn-on delay time ($\tau$) of the LD is based at least in part on the lasing threshold current ($I_{TH}$), pulse bias current ($I_P$) supplied to the LD, and/or the average carrier lifetime ($\tau_S$). The average carrier lifetime ($\tau_S$), also referred to as the recombination time, is an inherent property of the LD. As known in the art, emission of light from a laser diode, a LED, etc., is based at least in part on the recombination of electrons and holes.

In some embodiments, the dark laser heating (DLH) pulse bias techniques described herein may include preheating the LD (or LD cavity) using a plurality of "short interval" forward bias pulses. In one non-limiting example a "short interval" forward bias pulse may refer to a pulse that has a duration less than a threshold time (or threshold duration), where the threshold time may be based on the turn-on delay for the LD. In some embodiments, the threshold duration may be 5 ns, 3 ns, or 2 ns, to name a few. It should be noted that other threshold durations are contemplated in different embodiments and the example values listed herein are not intended to be limiting. For example, in some cases, the turn-on delay threshold duration may be 10 ns, or even 1 ns.

In some cases, the bias level of the forward bias pulses may be at or above a lasing threshold (i.e., sufficient to causing lasing or produce an optical output from the LD). However, the duration of each of these forward bias pulses may be less than the turn-on delay time for the LD. The turn-on delay time for a LD may refer to the duration between when a bias current (i.e., above a lasing threshold current) is supplied to the LD and an optical output response is produced by the LD. In some embodiments, the duration of each of the forward bias pulses may be a fraction of the turn-on delay time for the LD, for example, less than 90% of the turn-on delay time, around 50% of the turn-on delay time, etc. In some cases, the duration of each of the forward bias pulses may be the same or substantially the same. In other cases, the control circuitry may be configured to generate one or more forward bias pulses of a first duration and one or more forward bias pulses of a second, different duration, where each of the first duration and the second duration are less than the turn-on delay time for the LD.

Various illustrative aspects are directed to a data storage device comprising a disk; a read/write head configured to read data from and write data to the disk; a laser diode configured to heat an area of the disk near the read/write head; and one or more processing devices configured to preheat the laser diode to a target temperature associated with a write operation, wherein the preheating comprises applying at least one forward bias pulse to the laser diode, wherein a corresponding duration of the at least one forward bias pulse is shorter than a duration of a turn-on delay for the laser diode; and initiate a write operation for writing data to the disk, based at least in part on the preheating.

In some implementations of the data storage device, the one or more processing devices further comprise a preamplifier integrated circuit (IC), and wherein the preamp IC is used to perform the applying of the at least one forward bias pulse to the laser diode.

In some implementations of the data storage device, a corresponding bias current associated with the at least one forward bias pulse is above a lasing threshold current, and wherein the laser diode is in a non-lasing state when the at least one forward bias pulse is applied to preheat the laser diode.

In some implementations of the data storage device, applying the at least one forward bias pulse comprises applying a plurality of forward bias pulses, and wherein a corresponding duration of each of the plurality of forward bias pulses is shorter than the duration of the turn-on delay for the laser diode.

In some implementations of the data storage device, the one or more processing devices are further configured to preheat the laser diode by dark laser heating (DLH).

In some implementations of the data storage device, the turn-on delay corresponds to a time delay between when the at least one forward bias pulse is applied to the laser diode and when the laser diode produces an optical response.

In some implementations of the data storage device, no optical response is produced by the laser diode when a corresponding duration of the at least one forward bias pulse is shorter than the duration of the turn-on delay.

In some implementations of the data storage device, the turn-on delay is in a range from about 1 ns to about 10 ns.

In some implementations of the data storage device, the turn-on delay is based at least in part on an amount of pre-bias applied to the laser diode prior to the write operation, and wherein a bias current associated with the pre-bias is below a lasing threshold current.

In some implementations of the data storage device, the laser diode is configured to produce an optical response when the bias current is at or above the lasing threshold current.

In some implementations of the data storage device, the turn-on delay is based at least in part on a peak laser current, a pre-bias current, a recombination time ($\tau$), and a lasing threshold current.

In some implementations of the data storage device, the peak laser current is based at least in part on the target temperature, and wherein the target temperature corresponds to a steady-state temperature associated with the write operation.

Various illustrative aspects are directed to a method for operating a data storage device configured for heat-assisted magnetic recording using a laser diode, the method comprising preheating the laser diode to a target temperature associated with a write operation, wherein the preheating comprises applying at least one forward bias pulse to the laser diode, wherein a corresponding duration of the at least one forward bias pulse is shorter than a duration of a turn-on delay for the laser diode; and initiating, based at least in part on the preheating, the write operation for writing data to a disk of the data storage device.

In some implementations of the method, a preamplifier integrated circuit (IC) of the data storage device may be used to perform the applying of the at least one forward bias pulse to the laser diode.

In some implementations of the method, the laser diode is preheated using dark laser heating (DLH), and wherein a corresponding bias current associated with the at least one forward bias pulse is above a lasing threshold current, and wherein the laser diode is in a non-lasing state when the at least one forward bias pulse is applied to preheat the laser diode.

In some implementations of the method, applying the at least one forward bias pulse comprises applying a plurality of forward bias pulses, and wherein a corresponding duration of each of the plurality of forward bias pulses is shorter than the duration of the turn-on delay for the laser diode.

In some implementations of the method, the turn-on delay corresponds to a time delay between when the at least one forward bias pulse is applied to the laser diode and when the laser diode produces an optical response.

In some implementations of the method, no optical response is produced by the laser diode when a corresponding duration of the at least one forward bias pulse is shorter than the duration of the turn-on delay (i.e., a pulse width threshold).

In some implementations of the method, the turn-on delay is based at least in part on an amount of pre-bias applied to the laser diode prior to the write operation, and wherein a bias current associated with the pre-bias is below a lasing threshold current, and wherein the laser diode is configured to produce an optical response when an applied bias current is at or above the lasing threshold current.

In some implementations of the method, the turn-on delay is based at least in part on a peak laser current, a pre-bias current, a recombination time ($\tau$), and a lasing threshold current, and wherein the peak laser current is based at least in part on the target temperature, the target temperature corresponding to a steady-state temperature associated with the write operation.

Various illustrative aspects are directed to one or more processing devices comprising means for preheating a laser diode of a data storage device configured for heat-assisted magnetic recording using the laser diode, wherein the means for preheating comprises means for applying at least one forward bias pulse to the laser diode to preheat the laser diode to a target temperature associated with a write operation, wherein a corresponding duration of the at least one forward bias pulse is shorter than a duration of a turn-on delay for the laser diode; and means for initiating the write operation for writing data to a disk of the data storage device, based at least in part on the preheating.

In some implementations, the means for preheating the laser diode comprises means for preheating the laser diode using dark laser heating (DLH); a corresponding bias current associated with the at least one forward bias pulse is above a lasing threshold current; and the laser diode is in a non-lasing state when the at least one forward bias pulse is applied to preheat the laser diode.

In some implementations, the means for applying the at least one forward bias pulse comprises means for applying a plurality of forward bias pulses, wherein a corresponding duration of each of the plurality of forward bias pulses is shorter than the duration of the turn-on delay for the laser diode.

In some implementations, the turn-on delay corresponds to a time delay between when the at least one forward bias pulse is applied to the laser diode and when the laser diode produces an optical response.

In some implementations, no optical response is produced by the laser diode when a corresponding duration of the at least one forward bias pulse is shorter than the duration of the turn-on delay (or a pulse width threshold).

In some implementations, the turn-on delay is based at least in part on an amount of pre-bias applied to the laser diode prior to the write operation, and wherein a bias current associated with the pre-bias is below a lasing threshold current, and wherein the laser diode is configured to produce an optical response when an applied bias current is at or above the lasing threshold current.

In some implementations of the method, the turn-on delay is based at least in part on a peak laser current, a pre-bias current, a recombination time ($\tau$), and a lasing threshold current, and wherein the peak laser current is based at least in part on the target temperature, the target temperature corresponding to a steady-state temperature associated with the write operation.

Various further aspects are depicted in the accompanying figures and described below and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout different views. The drawings depict only illustrative examples of this disclosure and are not limiting in scope.

FIG. 4A is a conceptual graph depicting the turn-on time delay ($T_d$) for a LD, according to various aspects of the disclosure.

FIG. 4B is a conceptual graph showing a plurality of forward/positive bias pulses applied to a LD to preheat the LD using dark laser heating (DLH), according to various aspects of the disclosure.

DETAILED DESCRIPTION

Figure 1A:
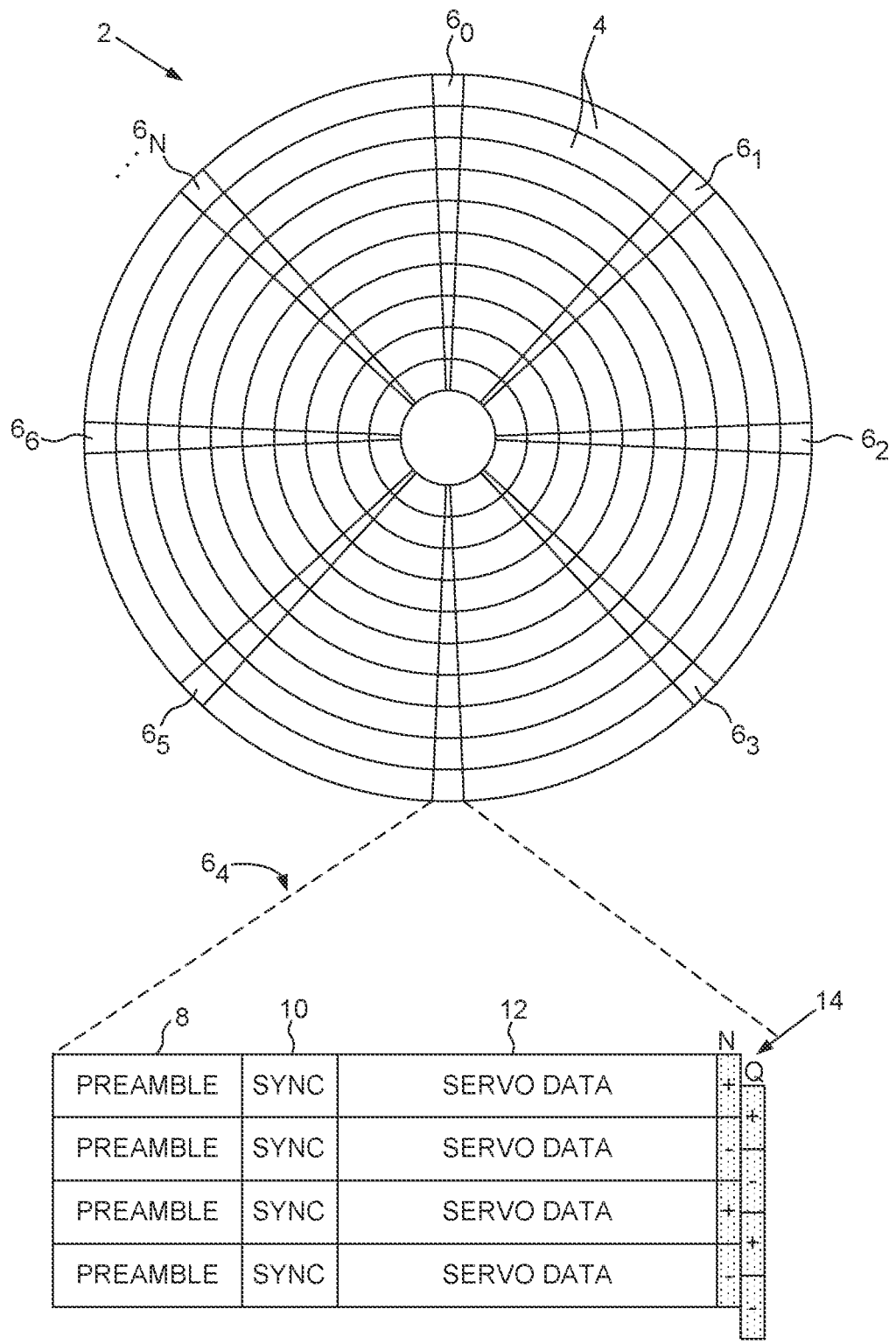
FIG. 1A is a conceptual diagram of a disk format comprising a number of radially-spaced, concentric servo tracks defined by servo wedges recorded around the circumference of each servo track, according to various aspects of this disclosure.

The word "exemplary" is used herein to mean "serving as an example, instance, or illustration." Any embodiment described herein as "exemplary" should not be construed as preferred or advantageous over other embodiments.

The embodiments described below are not intended to limit this disclosure to the precise form disclosed, nor are they intended to be exhaustive. Rather, they are presented to provide a description so that others skilled in the art may utilize their teachings. Technology continues to develop, and elements of the described and disclosed embodiments may be replaced by improved and enhanced items. However, the teachings of this disclosure inherently disclose elements used in embodiments incorporating technology available at the time of this disclosure.

The demand for data storage continues to increase rapidly, driving the need for hard drives that can store more data in the same physical space. However, traditional magnetic recording techniques face a physical limit known as the superparamagnetic limit. This is the point at which magnetic bits become so small that thermal fluctuations can cause them to spontaneously change state, leading to data loss. Heat-assisted magnetic recording (HAMR) is a technology developed to address this issue. HAMR overcomes the superparamagnetic limit by using heat to temporarily reduce the coercivity (resistance to changes in magnetization) of the magnetic material on the disk. This is achieved by using a laser diode (LD) to heat a small area of the disk, enabling data to be written at a higher density to that area. As the heated area cools, its coercivity returns to its original high level, effectively "locking" the data into place. HAMR allows for much higher data densities than traditional magnetic recording techniques, as it allows data bits to be written much more closely together without the risk of thermal instability.

In HAMR, a phenomenon known as "mode hopping" occurs when the LD used for heating the magnetic material switches, or "hops," between different lasing modes. Each mode corresponds to a different pattern of standing waves within the laser diode's cavity, which in turn corresponds to a specific wavelength of emitted light. Mode hopping in HAMR can be induced by temperature variations in the LD (or LD cavity within which the LD is positioned). As the LD operates, it naturally generates heat. Some non-limiting examples of factors that can affect LD temperature include power input, operation duty cycle, ambient temperature, and heat dissipation mechanisms. As the temperature of the LD changes, it can also impact the refractive index and/or physical dimensions of the LD cavity, potentially shifting the wavelength or frequency of the light emitted by the LD. In some instances, this shift may cause the laser to switch from one mode to another, herein referred to as "mode hopping".

In some cases, the mode-hop effects induced in a laser can adversely affect the laser's ability to deliver optical power to the disk media in a consistent/effective manner. Furthermore, as noted above, the mode-hop effects are temperature dependent. In some circumstances, the optical power delivered to the disk media may depend on the reflection and/or absorption occurring in the LD and/or the near-field transducer (NFT). Thus, in some regards, the optical power spectrum of the LD is temperature dependent. Additionally, the frequency response of an optical transmission system may depend on the absorption, reflections, and/or physical length (e.g., length of LD cavity and/or waveguide). The combination of the optical power spectrum's temperature dependence and resonances in the optical transmission system may lead to fluctuations in the optical power delivered to the disk media, which can adversely impact HAMR recording performance.

Figure 3:
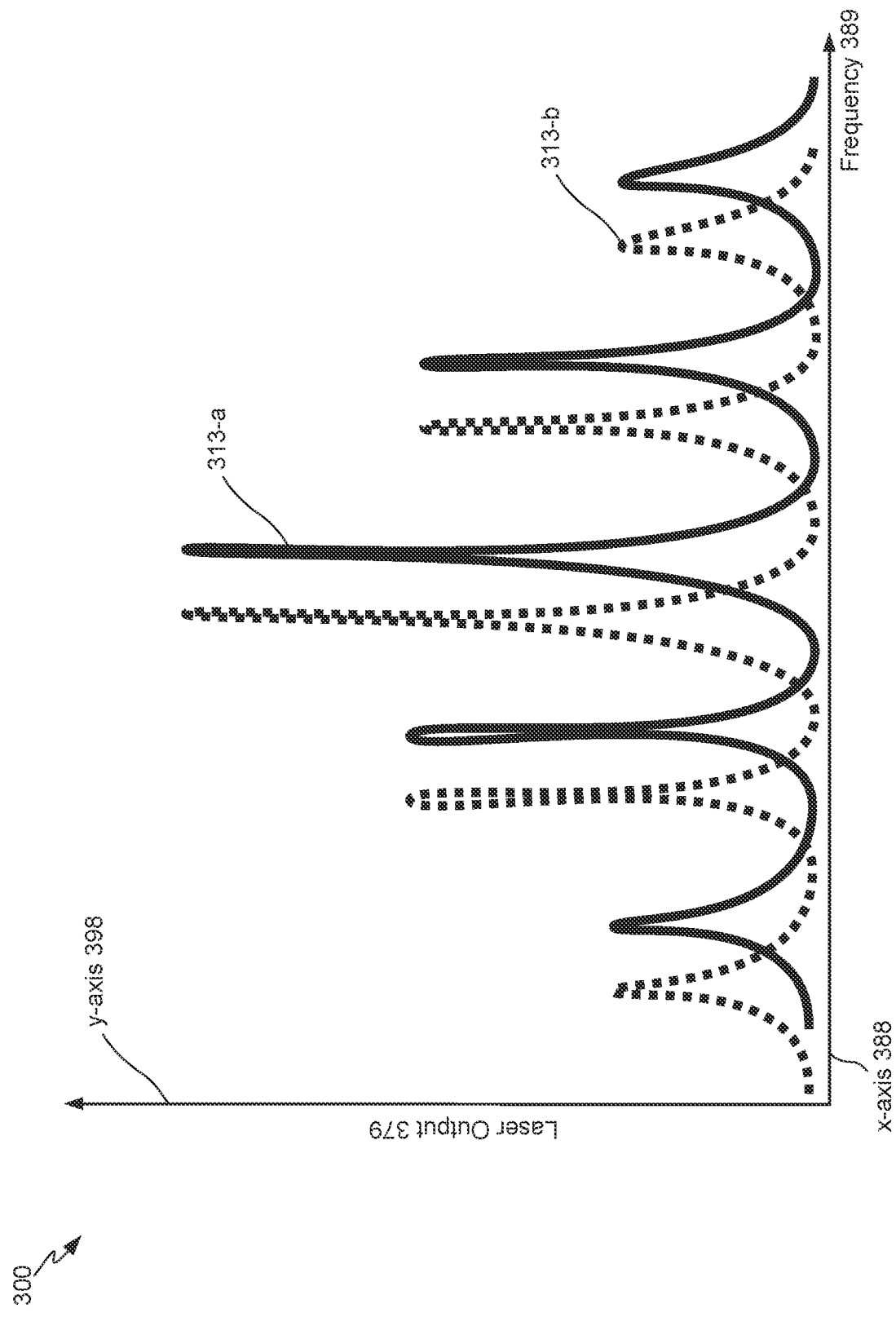
FIG. 3 is a conceptual graph showing an optical power spectrum of a laser diode (LD) utilized in a HAMR drive for two different operating temperatures $T_1$ and $T_2$, according to various aspects of the disclosure.

FIG. 3 depicts a conceptual graph 300 of laser output 379 (on the vertical or y-axis 398) against frequency 389 (on the horizontal or x-axis 388) for two different LD temperatures. Specifically, graph 300 shows a first trace 313-$a$ corresponding to an optical power spectrum (or laser output) for a first LD temperature. Additionally, graph 300 also shows a second trace 313-$b$ corresponding to an optical power spectrum of the same LD at a second LD temperature. In some aspects, FIG. 3 illustrates the temperature dependent nature of the optical output produced by a LD of a HAMR drive.

Mode hopping can have several negative consequences in the context of HAMR. Mode hopping can cause sudden changes in the laser's output power and frequency, leading to variations in the heating of the magnetic material. This can result in inconsistent performance and potentially affect the reliability of the data recording process. Moreover, the optical components in the HAMR head may be optimized for a specific wavelength. If mode hopping causes the laser to emit light at a different wavelength, this could reduce the effectiveness of the heating process. Effective temperature management of the LD is critical to mitigate mode hopping and to maintain reliable operation of the HAMR system.

To mitigate against such issues, aspects of the present disclosure are directed to a technique for preheating the LD and/or LD cavity to a target temperature to minimize or reduce fluctuations in the optical power delivered by the LD. In some cases, the target temperature may correspond to a steady-state temperature associated with a write operation. In some cases, preheating the LD to the steady-state temperature prior to writing data to a disk may help prevent or reduce the likelihood of mode hops due to temperature transients. In some circumstances, a laser encounters "mode hops" when the temperature transient changes. For instance, a laser may suddenly switch from operating in one resonator mode (e.g., producing energy with a first wavelength) to another mode (e.g., producing energy with a second, different wavelength) when the temperature transient equals a mode hop critical temperature. The laser then operates in the new resonator mode (e.g., producing energy with the second wavelength) for a range of temperature transients before switching to a different resonator mode (e.g., producing energy with a third wavelength).

In some instances, a technique referred to as dark laser heating "DLH" may be employed to preheat a LD to the target or steady state temperature prior to the write operation. In such cases, the LD consumes power and generates heat without significantly emitting photons, the particles responsible for light emission. Some prior art DLH techniques utilize a pre-bias below the lasing threshold, which serves to warm up the LD while preventing light emissions. By operating below this lasing threshold (i.e., current or voltage sufficient to causing lasing or produce an optical output from the LD), the LD predominantly performs as a traditional diode, converting the electrical power it receives into heat instead of light. This allows the LD to warm up to a specific temperature without substantial light emission, hence the term "dark" laser heating. However, such techniques tend to be inadequate (e.g., can result in mode changes) when used for power levels that are at or near the operating temperature (e.g., for a write operation).

In some other cases, DLH may comprise applying a reverse bias (or negative voltage) to the LD, where an amount of reverse bias applied is based at least in part on the forward bias associated with the write operation. That is, the reverse bias level applied to preheat the laser diode prior to the write operation is based at least in part on the optical power or temperature associated with the write operation (i.e., when the LD is forward biased). DLH using a reverse bias often requires a large negative bias voltage (e.g., below −15 volts, −17 volts, −20 volts, to name a few non-limiting examples) which can be difficult to implement without significant hardware modifications. In most circumstances, a preamp may not be practical when such a large reverse bias voltage needs to be applied to the LD, as effective implementation of such a solution may require high-voltage integrated circuits (ICs) to buffer and control the reverse bias applied to the LD.

As noted above, the LD may act like an ordinary LED when the current supplied to the LD is below the lasing threshold current (i.e., the current at which the LD starts lasing or produces an optical output). Furthermore, when the current supplied to the LD is increased such that it is at or above the lasing threshold current, the gain of the laser equals the loss of the LD cavity and/or mirrors, which leads to an optical output from the LD. In some cases, the turn-on delay may refer to the time between when a bias current (e.g., above the lasing threshold current) is applied to a LD and when an optical output response is produced by the LD. The optical turn-on delay ($\tau$) of the LD is dependent on a variety of factors, including at least the lasing threshold current ($I_{TH}$), pulse bias current ($I_P$) supplied to the LD, and/or the average carrier lifetime ($\tau_S$). The average carrier lifetime ($\tau_S$), also referred to as the recombination time, is an inherent property of the LD. As known in the art, emission of light from a laser diode, a LED, etc., is based at least in part on the recombination of electrons and holes.

Figure 1B:
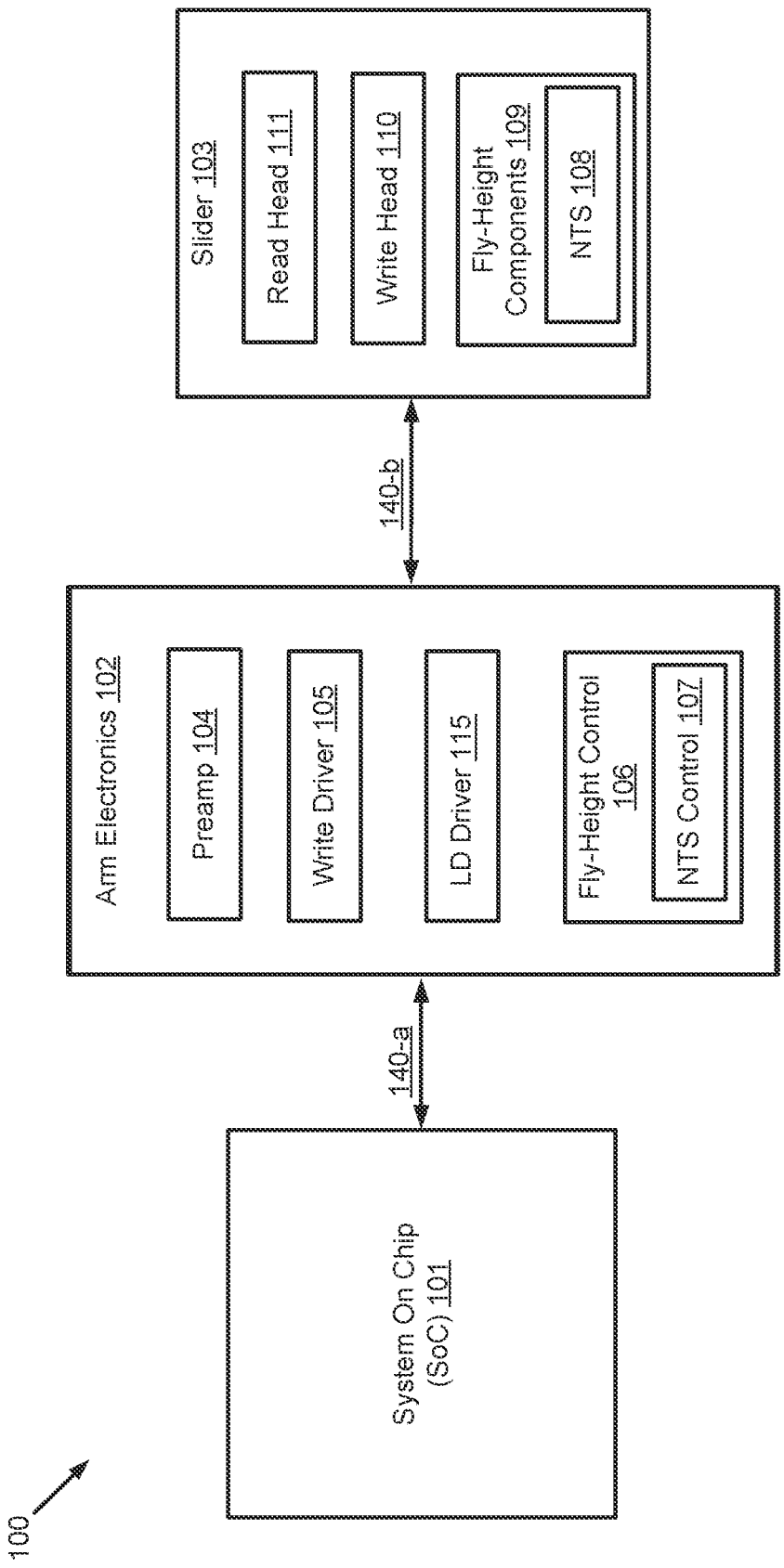
FIG. 1B shows a block diagram illustration of selected components of a disk drive, according to various aspects of the present disclosure.

A disk drive 100 according to various aspects of the disclosure, as seen in FIG. 1B, comprises a system on a chip (SoC) 101, where the SoC 101 comprises the electronics and firmware for the drive and used to control the functions of the drive including providing power and/or control signals to the components shown in arm electronics (AE) 102. Each disk (shown as disk 16 in FIG. 1C, disks 16A-D in FIG. 2B) can have thin film magnetic material on each of the planar surfaces. Each recording surface may comprise a dedicated pair of read and write heads packaged in a slider 103 that is mechanically positioned over the rotating disk by an actuator (e.g., shown as actuator assembly 19 in FIG. 2B). In some examples, the actuator(s) also provide the electrical connections to the slider 103 components. The actuator assembly 19 may also comprise the AE 102, the AE 102 comprising preamplifiers or preamps 104 (e.g., read and/or write preamp) for the heads (e.g., read head 111, write head 110), write driver 105, laser diode (LD) driver 115, and fly-height controls 106. In some examples, the fly-height control circuit 106 includes a near field transducer (NFT) temperature sensor (NTS) control circuit 107, for example, when the disk drive employs heat assisted magnetic recording (HAMR). In this example, the fly-height control system also includes NTS 108 in the slider along the associated NTS control circuitry 107 in the AE 102. It is noted that some of the components shown in AE 102 can be implemented or partially implemented in SoC 101, according to various aspects of the disclosure. While the AE 102 is shown as including preamps 104, in some cases, an AE inclusive of some or all of the functional blocks above other than preamps 104 may be implemented together in a preamp IC, and the AE may be referred to as preamp IC 102 below.

As seen, a first connection (e.g., flex cable) 140-*a* connects the SoC 101 to the AE 102, while a second connection (e.g., flex cable) 140-*b* connects the AE 102 to the slider 103. The AE 102 typically include digital and analog circuitry that control the signals sent to the components in the slider 103 and process the signals received from the components of the slider 103. The AE 102 can include registers that are set using serial data from the SoC 101 to provide parameters for the AE functions. The write driver 105 generates an analog signal that is applied to an inductive coil in the write head 110 to write data by selectively magnetizing portions of the magnetic material on the surface of the rotating disk(s) 16. It is noted that while AE is so named as the electronic components are generally placed at the arm actuators in various embodiments, the actual physical location may vary in other embodiments.

As a disk rotates under a slider of a hard disk drive (HDD), the slider 103 is said to "fly" above the disk. In some cases, a thermal fly-height control (TFC) device (e.g., heater element) can be disposed within the slider 103 to contort the slider near the read and write transducers (or elements), which lowers the fly-height for the read and write transducers. In some examples, read and write elements or transducers reside in the slider 103 of the disk drive 100. In some cases, the disk drive 100 comprises fly-height control circuitry 106 that interfaces with fly-height components in the slider 103. TFC is one example of a control technique that uses a heater element (not shown) disposed in the slider 103. The fly-height can be adjusted by heating the slider 103 with the heater. Electrical current supplied to the heater by fly-height control circuitry 106 generates heat to thermally expand the slider 103 and modulate the fly-height. As seen, the slider 103 also includes fly-height components 109 and the NTS 108. In some embodiments, the fly-height components 109 can also include other elements in addition to the heater.

The slider 103 includes write head 110 configured to write data to a disk (e.g., disk 16), a read head 111 configured to read data from the disk, fly-height components 109 configured to adjust slider fly-height (as described above) and a resistive temperature detector (RTD), such as NTS 108, for sensing the temperature near the air-bearing surface (ABS). It is noted that ABS is generally used to describe the surface of the slider 103 facing the disk 16, where the disk drive could be filled with gases other than air (e.g., gases containing helium, nitrogen, to name two non-limiting examples) and that the use of the "ABS" term to describe various aspects of the disclosure is not intended to limit the disclosure to air filled drives. In some cases, the NTS 108 is located proximate to the ABS and write head 110 (or alternatively the read head 111). The NTS 108 facilitates detecting a temperature generated by the slider's proximity to the disk or media. In various embodiments, the NTS 108 may comprise a thermal strip (e.g., metallic or semiconductor strip) on the slider 103. In some cases, the relative temperature at the ABS may be used to estimate the resistance, $R_{RTD}$, of the RTD, such as an embedded contact sensor (ECS) or the NTS 108. Typically, the resistance of a material can be represented as a function of its intrinsic resistance and its dimensions (e.g., length, width, thickness or height).

In some cases, a HAMR recording head (e.g., write head 110) also comprises optical components that direct light from a laser to the disk. During recording, a write element applies a magnetic field to a heated portion of the storage medium or disk 16, where the heat lowers the magnetic coercivity of the media, allowing the applied field to change the magnetic orientation of the heated portion. The magnetic orientation of the heated portion determines whether a one or a zero is recorded. Thus, by varying the magnetic field applied to the magnetic recording medium while it is moving, data can be encoded onto the medium. A HAMR drive employs a laser diode or LD (e.g., laser diode 128 in FIG.

1C) to heat the media to aid in the recording process. In some cases, the LD 128 is disposed within an LD cavity and is proximate to a HAMR read/write element 144, where the read/write element 144 has one end on the ABS of the slider 103. The ABS faces and is held proximate to a moving media surface (e.g., surface of disk 16) during operation of the HDD. In some cases, the LD, such as LD 128, may be driven by a LD driver (e.g., LD driver 115 in AE or preamp IC 102, as shown in FIG. 1B). In other embodiments, the LD can be driven by other components within the broader control circuitry 22 in the drive such as the SoC or other circuitry.

Figure 1C:
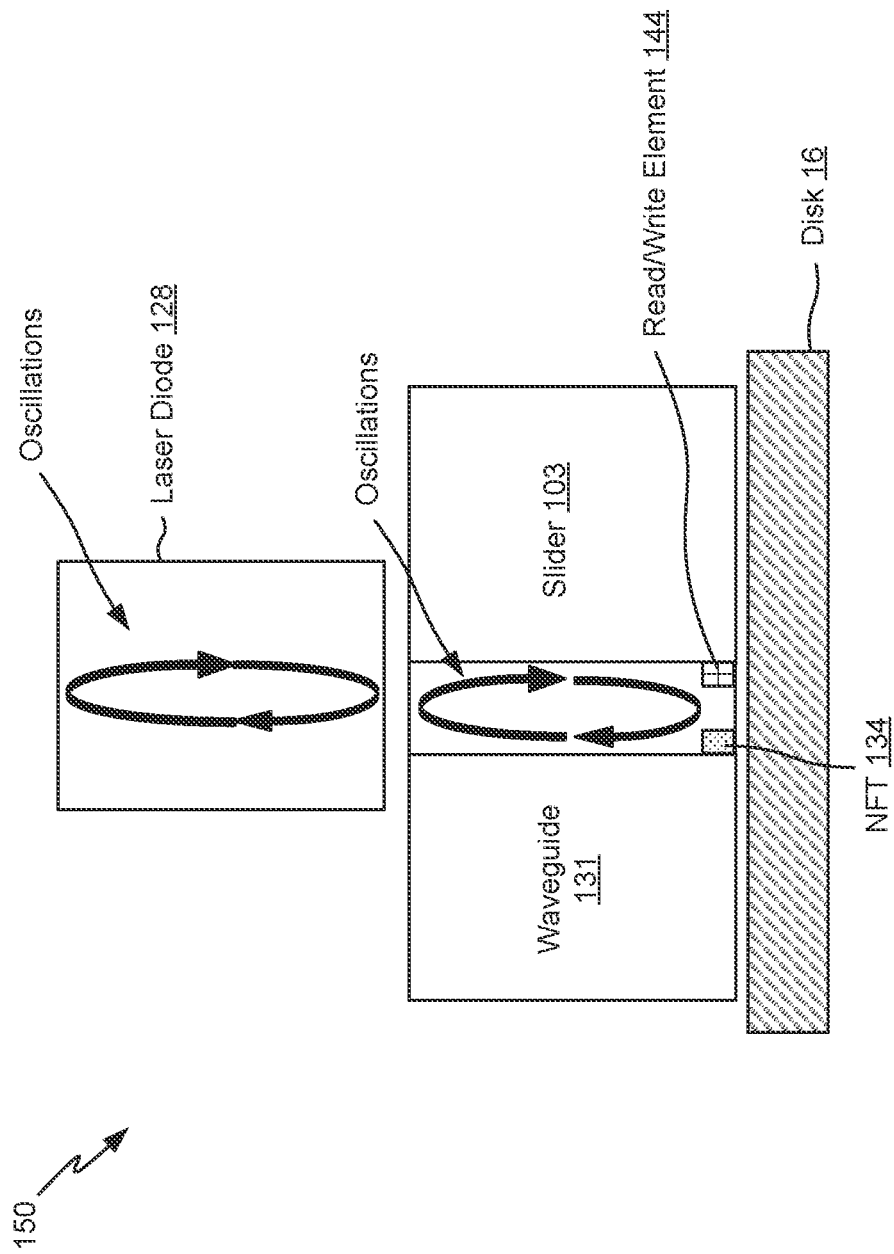
FIG. 1C illustrates a block diagram showing a waveguide, a laser diode, a disk, and a slider of a data storage device, according to various aspects of the present disclosure.

The LD 128 provides optical-based energy to heat the media surface, e.g., at a point near the read/write element 144. In some cases, optical path components, such as a waveguide 131, are formed integrally within the slider 103 to deliver light from the LD 128 to the NFT 134 which provides targeted heat to the media/disk. For example, as shown in FIG. 1C, a waveguide 131 and NFT 134 are located proximate to the read/write element 144 to provide local heating of the media or disk 16 during write operations. In some circumstances, various components (e.g., read/write element 144, NFT 134, LD 128, etc.) may experience significant heating due to light absorption and inefficiencies in electrical-to-optical energy conversion as energy produced by the LD 128 is delivered to the magnetic recording medium or disk 16. In some cases, for example, during the start of a write operation, the temperature of the LD experiences significant variations, causing a shift in laser emission wavelength. This in turn leads to a change of optical feedback from the optical path in the slider 103 to the LD cavity, resulting in mode hopping (i.e., power instability) of the LD 128. Mode hopping can degrade performance of HAMR drives, as mode hopping leads to shifting/jumping of laser output power leading to one or more of magnetic track width variations and magnetic transition shifting between data blocks. Large transition shifts in data blocks may increase errors, degrading disk drive performance and/or causing encroachment on adjacent data tracks.

Broadly, aspects of the present disclosure are directed to preheating an LD to a target temperature (e.g., steady state temperature associated with a write operation) using a novel DLH technique, described in further detail below. Specifically, but without limitation, the LD 128 may be preheated to a temperature that is at or near the steady state temperature associated with the write operation using positive/forward bias pulses, herein referred to as DLH-pulse bias. In some embodiments, the duration or width of the forward bias pulses may be selected to be lower than a turn-on time delay ($\tau$) of the LD 128, which prevents the LD 128 from producing an optical output. In some cases, the techniques described herein can be implemented using existing preamp IC technology with minimal hardware modifications. Furthermore, preheating the LD using forward bias pulses that have a duration less than a turn-on delay threshold duration (e.g., <20 nanoseconds) may serve to prevent an optical output response from the LD 128, which in turn can help minimize or reduce the risk of data erasure/degradation.

Figure 2A:
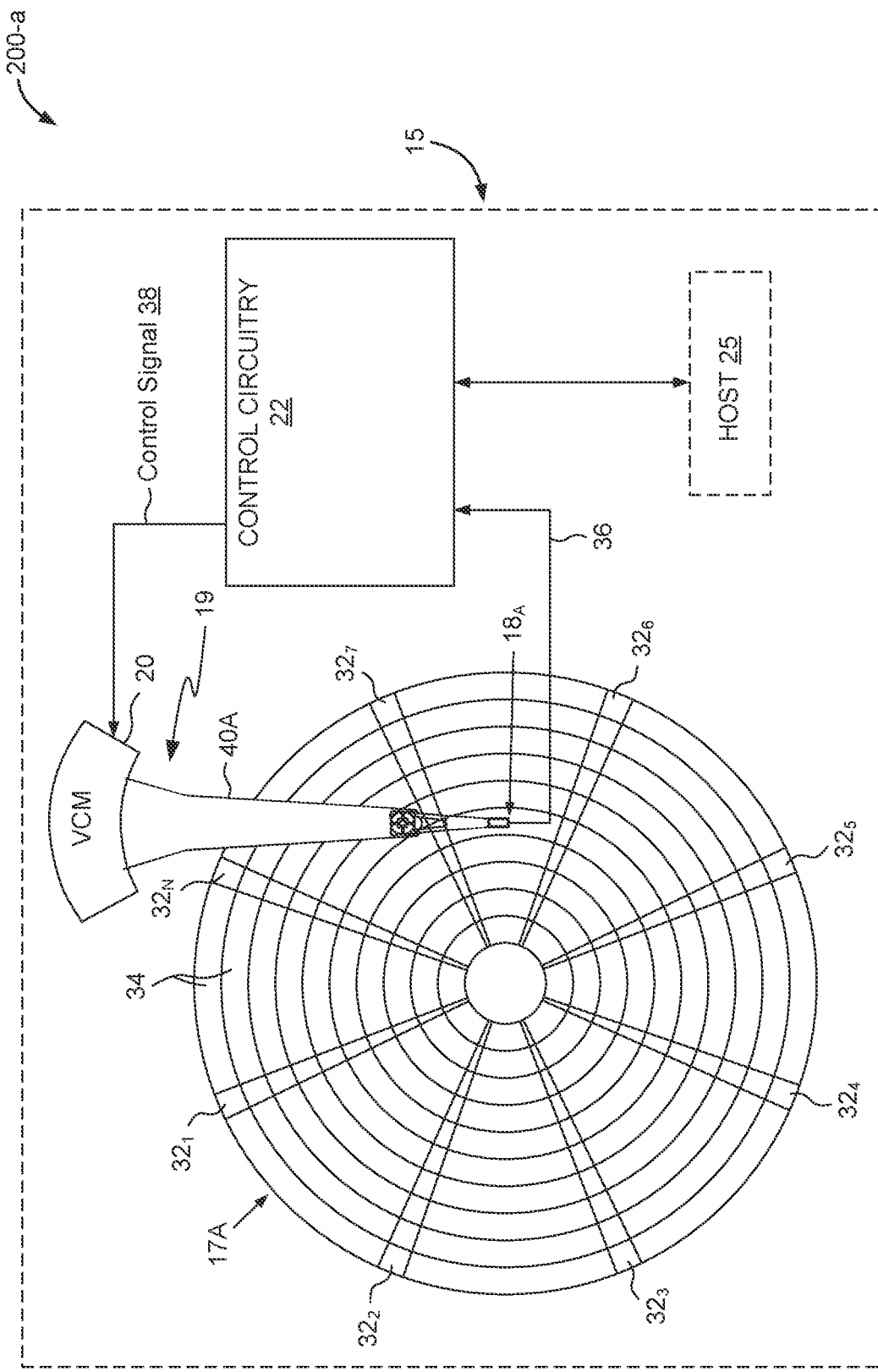
FIG. 2A is a conceptual block diagram of a top view of a data storage device in the form of a disk drive, according to various aspects of this disclosure.
Figure 2B:
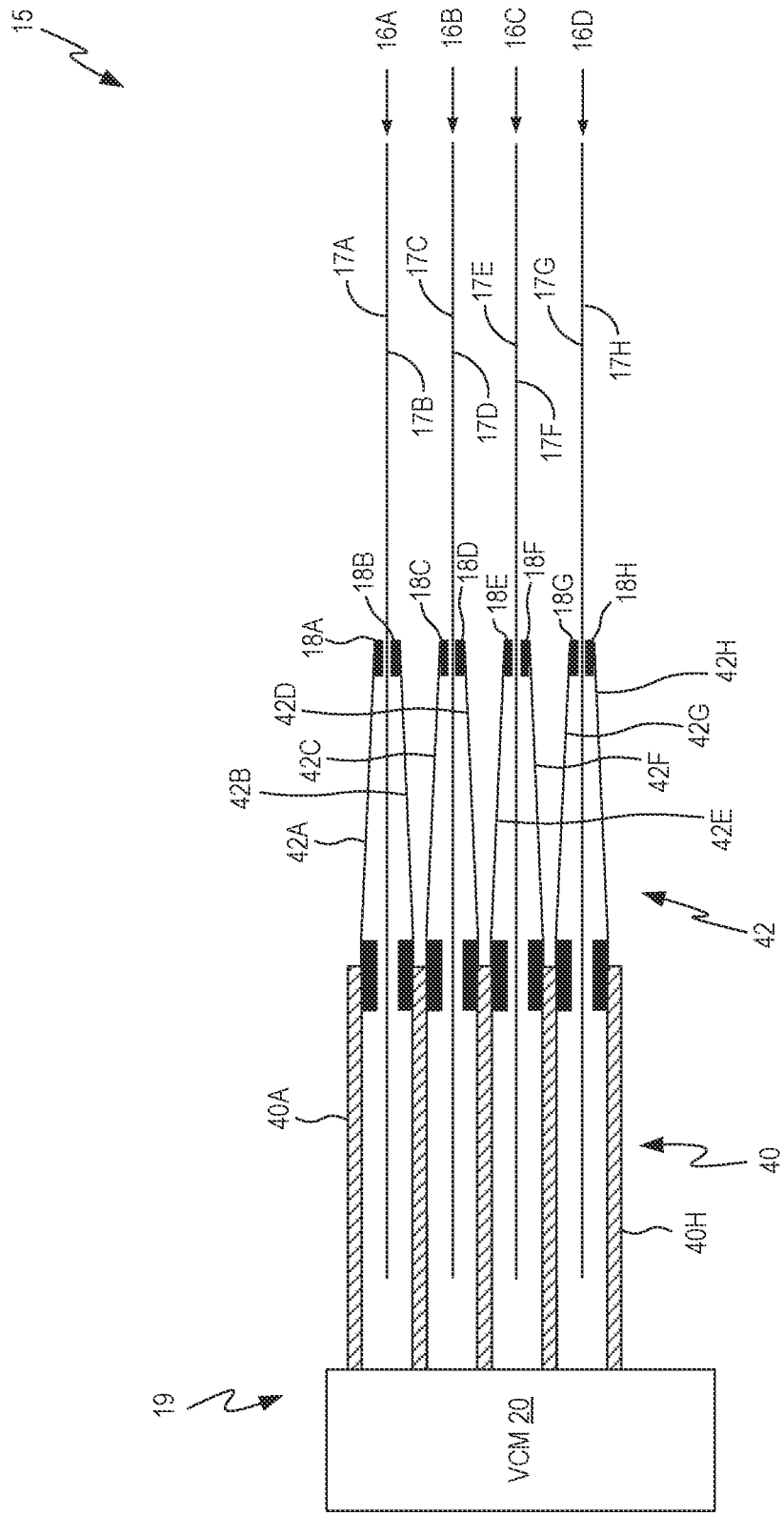
FIG. 2B is a conceptual block diagram of a side view of the data storage device in FIG. 2A, according to various aspects of this disclosure.
Figure 2C:
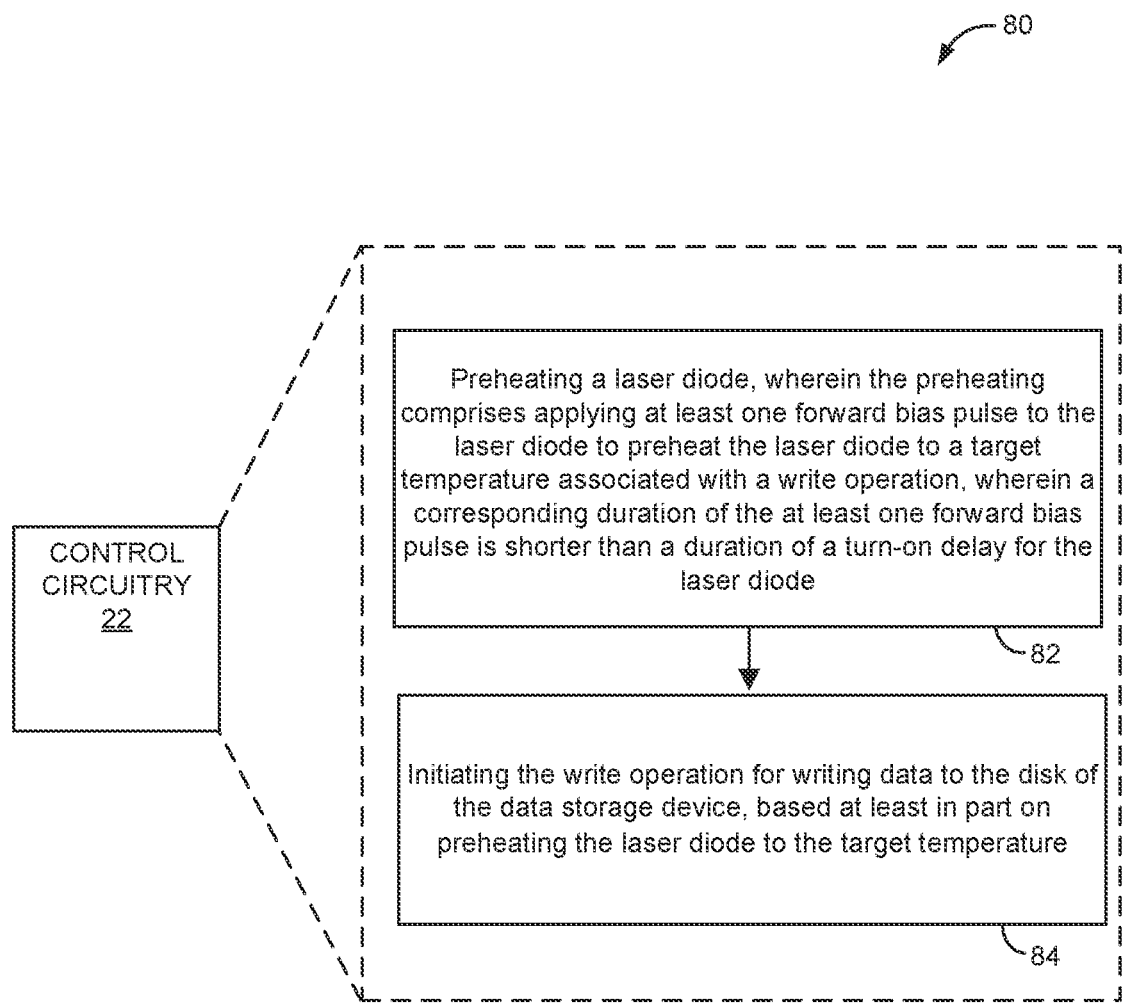
FIG. 2C is a flow diagram of a method that a data storage device may perform, execute, and implement, according to various aspects of this disclosure.

FIGS. 2A and 2B are conceptual top and side views 200-*a* and 200-*b*, respectively, of a data storage device in the form of disk drive 15, in accordance with various aspects of this disclosure. Disk drive 15 implements one or more aspects of the disk drives 100 and/or 150 described above in relation to FIGS. 1B and/or 1C, respectively. As seen in FIGS. 2A-2C, the disk drive 15 comprises control circuitry 22, actuator assembly 19, and a plurality of hard disks 16 (i.e., disks 16A, 16B, 16C, 16D).

Actuator assembly 19 is configured to position one or more heads 18 over disk surfaces 17 of one or more disks 16. Head(s) 18 comprise write and read elements, configured for writing and reading control features and/or data to and from a corresponding disk surface 17 of disk(s) 16. In some cases, head(s) 18 may be similar or substantially similar to the read head 111 and/or write head 110 described in relation to FIG. 1B. As seen in FIG. 2B, actuator assembly 19 comprises primary actuator 20 (e.g., a voice coil motor ("VCM")) and a number of actuator arms 40 (e.g., topmost actuator arm 40A, lowest actuator arm 40H). Each actuator arm 40 comprises a head 18 at a distal end thereof (e.g., head 18A at a distal end of topmost actuator arm 40A in FIGS. 2A-2B). Each actuator arm 40 is configured to suspend a respective head 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include a wide variety of other numbers of hard disks and disk surfaces, other numbers of actuator arm assemblies and primary actuators, and other numbers of fine actuators on each actuator arm than those illustrated in FIGS. 2A-2B.

FIG. 2A also depicts servo sectors 32 (e.g., servo sectors $32_1$ through $32_N$) written onto disk surfaces 17. Servo sectors 32 may be written to disk surfaces 17 to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a read signal 36 emanating from head $18_A$ to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a VCM control signal) applied to VCM 20 which rotates actuator arm 40 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension, or for actuating a suspension relative to actuator arm 40.

Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Each read/write head 18 is conventionally embedded in the trailing edge of a component known as a slider (e.g., slider 103 in FIGS. 1B and/or 1C). The slider in turn is affixed to a suspension, which is found at the terminating end of actuator arm 40. As disk 16 spins at a high speed, the slider is lifted, or 'flies', above disk 16. It hovers on a thin layer of air, maintaining a stable distance measured in nanometers from disk surface 17. This minuscule distance permits read/write heads 18 to retrieve or store data while avoiding direct physical contact with disk surface 17, thereby preventing data corruption and potential damage to disk surface 17.

FIG. 2C is a flow diagram of a method 80 that control circuitry 22 of disk drive 15 may perform or execute in controlling the operations of disk drive 15, including the operations of HAMR components on heads 18 (e.g., heads 18A, 18B, 18C, 18D, 18E, 18F, 18G, and/or 18H) disposed on actuator assembly 19, as further described below. In particular, method 80 can help mitigate laser diode mode hopping during HAMR using a DLH technique, as will be described in detail below.

As seen, a first operation 82 of the method 80 may comprise preheating a laser diode of a data storage device (e.g., a HAMR drive), where the preheating comprises applying at least one forward bias pulse to the laser diode to preheat the laser diode to a target temperature associated with a write operation, and wherein a corresponding duration of the at least one forward bias pulse is shorter than a duration of a turn-on delay for the laser diode. Next, a second operation 84 of the method 80 comprises initiating the write operation for writing data to the disk of the data storage device, based at least in part on preheating the laser diode to the target temperature.

Turning now to FIG. 4A, which illustrates a conceptual graph 400-*a* depicting the turn-on time delay ($T_d$) for a LD, according to various aspects of the disclosure. In FIG. 4A, time 440-*a* is shown along horizontal or x-axis 488-*a*, while amplitude 450-*a* (e.g., optical output of LD, which may be measured using a photodiode (PD) or another light sensor) is shown along vertical or y-axis 498-*a*. As seen, there is an optical turn-on delay ($T_d$) between when the bias current (i.e., above the lasing threshold current) is applied to the LD and when the LD produces an optical output response. In some embodiments, one or more short interval forward bias pulses can be applied to the LD, where the duration/width of the short interval forward bias pulses can be selected to be less than the turn-on delay ($T_d$) of the LD.

For instance, as shown in conceptual graph 400-*b* in FIG. 4B, a plurality of forward bias pulses are applied to the LD, each having a duration/width that is less than the turn-on delay of the LD. In such cases, the electrical energy supplied to the LD helps warm up the LD and/or LD cavity. Specifically, the temperature rise of the LD and/or LD cavity is based at least in part on the amplitude (e.g., root mean square (RMS) amplitude) of the bias voltage/current applied to the LD. FIG. 4B depicts a plurality of forward bias pulses 413-*b*, each having a duration that is less than the turn-on delay for the LD. Here, the forward bias pulses 413-*b* correspond to the LD bias current. Additionally, FIG. 4B also shows the optical output response 423-*b*. As seen, when the duration of the forward bias pulses is less than the turn-on delay ($T_d$) for the LD, no optical output 423-*b* is observed from the LD. It should be noted that the peak or RMS amplitude of the LD bias current may be greater than the lasing threshold current (i.e., the current at which the LD starts lasing or produces an optical output). As noted above, the disclosed DLH technique using "short" interval forward bias pulses can be implemented using existing preamp IC technology with minimal to no hardware modifications to the disk drive (e.g., disk drive 15 in FIG. 2A). For example, the LD driver 115 in the AE or preamp IC 102 may be used to drive the LD as aligned to the timing of FIGS. 4A, 4B, 5 and 6. In other embodiments, the LD can be driven by other components within the broader control circuitry 22 in the drive such as the SoC or other circuitry.

Figure 5:
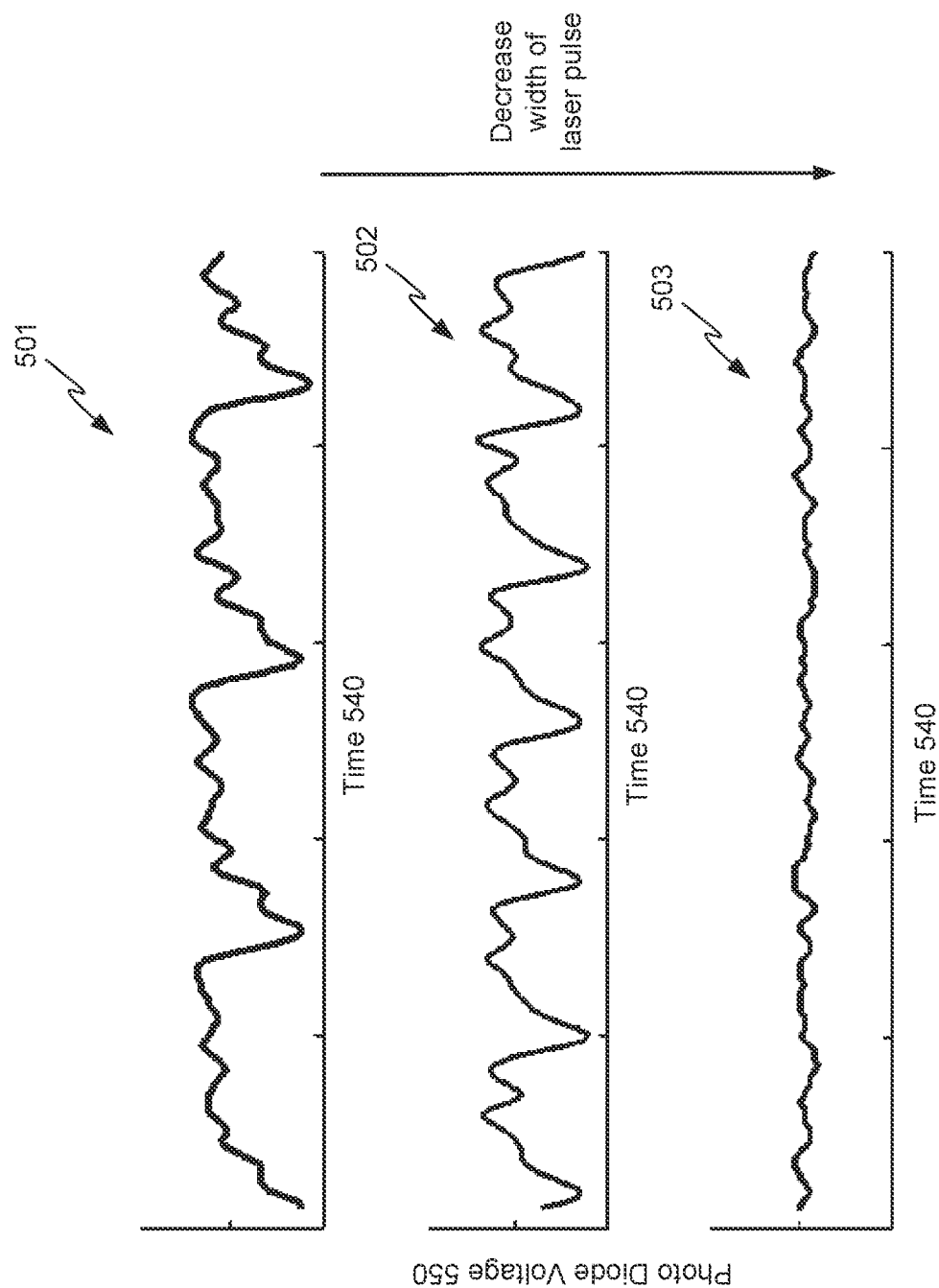
FIG. 5 illustrates a conceptual graph showing optical output against time for different widths of forward bias pulses supplied to a LD, according to various aspects of the disclosure.

FIG. 5 illustrates a conceptual graph 500 showing optical output (e.g., represented as photodiode or PD voltage 550) against time 540 for different widths of forward bias pulses supplied to a LD, according to various aspects of the disclosure. In some cases, the optical output of the LD, such as LD 128, may be measured using a PD (photo detector), although other types of light sensors known in the art are also contemplated in different embodiments. In this example, the amplitude of the forward bias pulse used to generate the three plots 501, 502, and 503 may be the same or substantially the same. Additionally, the amplitude of the forward bias pulses supplied to the LD may be at or above the lasing threshold current (i.e., sufficient to produce light emissions from the laser).

Plot 501 depicts the optical output response against time 540 for a LD when the LD is biased using a plurality of forward bias pulses of a first width and a first amplitude. As seen, the LD produces an optical output response (e.g., measured using a PD) when the width of the forward bias pulses is greater than the turn-on delay for the LD and the amplitude of the forward bias pulses is greater than the lasing threshold current. As the width of the forward bias pulses is decreased (plot 502), the LD produces an optical output response if the width of the forward bias pulses exceeds the optical turn-on delay and the bias current exceeds the lasing threshold current. However, a further decrease in forward bias pulse width, e.g., plot 503, may result in no optical output response from the LD. For instance, when the width of the forward bias pulses supplied to the LD decreases below a threshold (e.g., optical turn-on delay for the LD), the optical output produced by the LD is negligible (or nearly zero). In such cases, the electrical power supplied to the LD helps warm up the LD and/or LD cavity to a temperature that is at or near the target/steady-state temperature, while minimizing or reducing the optical output produced by the LD. This technique of DLH can help mitigate against accidental data erasure/overwrite while also minimizing the occurrence of mode-hops during the start of a write operation. Furthermore, DLH using short-interval forward bias pulses can be implemented using existing preamp IC technology, which facilitates a more streamlined approach when compared to other prior art DLH techniques.

In some cases, the laser or LD can be pulsed using nanosecond or picosecond pulses. As noted above, LDs have an inherent turn-on time delay ($T_d$) between the optical response and the applied signal. The theoretical delay for a LD may be represented as follows:

$$\tau_d = \tau \ln \frac{[I_{Peak} - I_{Prebias}]}{[I_{Peak} - I_{Th}]} \quad (1)$$

As seen from equation (1), the turn-on delay reduces with laser pre-bias ($I_{Prebias}$).

Figure 6:
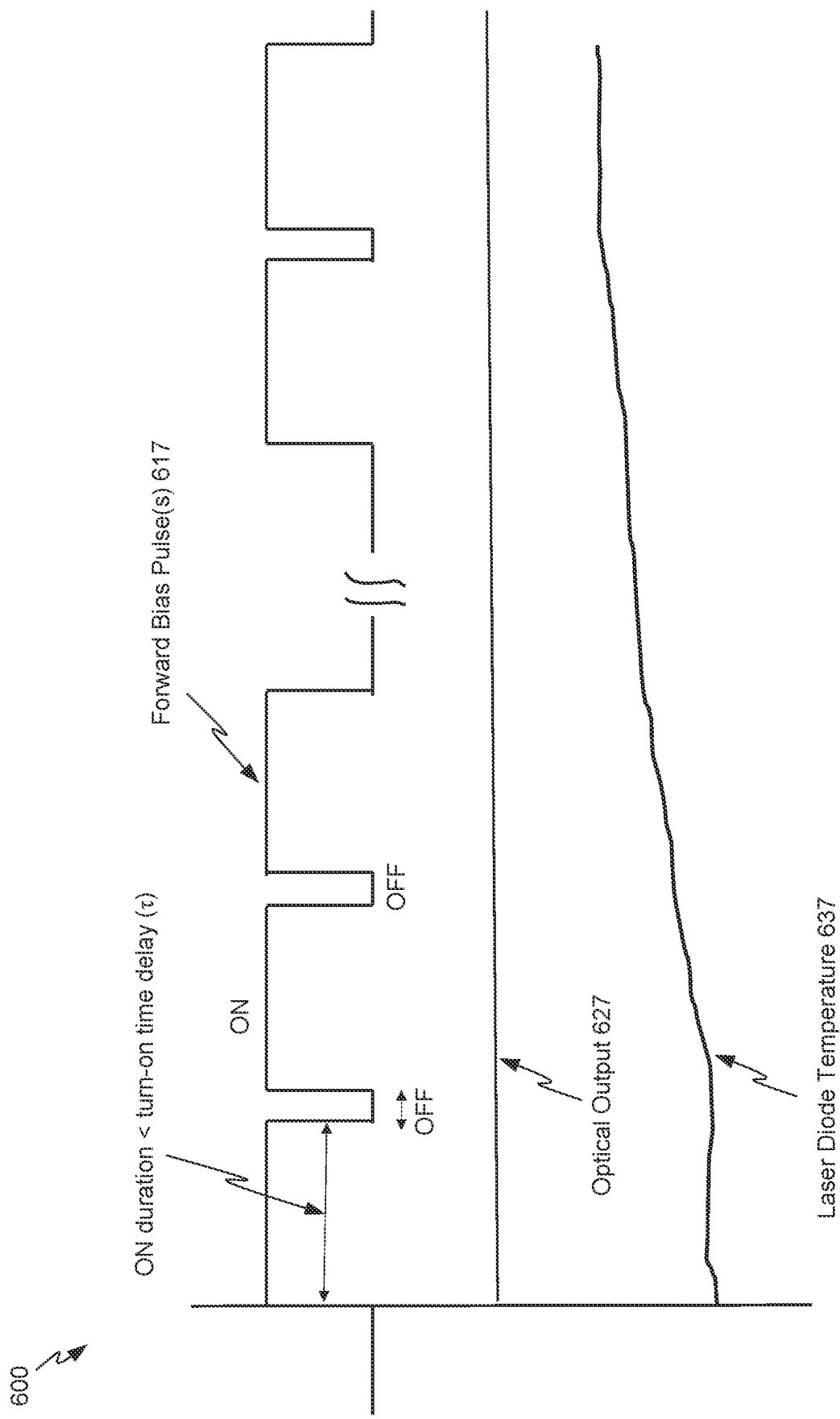
FIG. 6 illustrates conceptual graphs showing a train of forward bias pulses applied to a LD, a corresponding optical output measured using a light sensor (e.g., photodiode), and a temperature of the LD, according to various aspects of the disclosure.

FIG. 6 illustrates conceptual graphs 600 showing a train of forward bias pulses 617 applied to a LD, a corresponding optical output 627 measured using a photodiode (or another applicable light sensor), and a temperature 637 of the LD, according to various aspects of the disclosure. While FIG. 6 depicts the forward bias pulse(s) 617 as having the same or substantially the same width/duration, this is not necessary. That is, in some embodiments, the forward bias pulse(s) 617 can have different widths as long as the selected widths are less than the turn-on time delay ($T_d$).

As seen in FIG. 6, a plurality of forward bias pulses 617 may be applied to the LD, which helps heat accumulation in the LD. By controlling the width of the forward bias pulses, i.e., to be less than the optical turn-on delay for the LD, the LD can accumulate heat without producing an optical output. In this way, the disclosed DLH technique can be employed to preheat the LD and/or LD cavity in a manner that helps minimize or reduce the effects of mode-hops while also ensuring data integrity (i.e., prevent erasure or overwrite of data previously written to the disk). In this example, the optical output 627 of the LD, e.g., measuring using a photodiode, is negligible since the ON duration of the forward bias pulses is controlled to be below the turn-on delay ($\tau$) for the LD. Furthermore, FIG. 6 also depicts the rise in LD temperature 637 as the train of forward bias pulse(s) 617 are applied to the LD. As seen, there is a steady rise in LD temperature 637 (or LD cavity temperature) from cycle-to-cycle.

Figure 7:
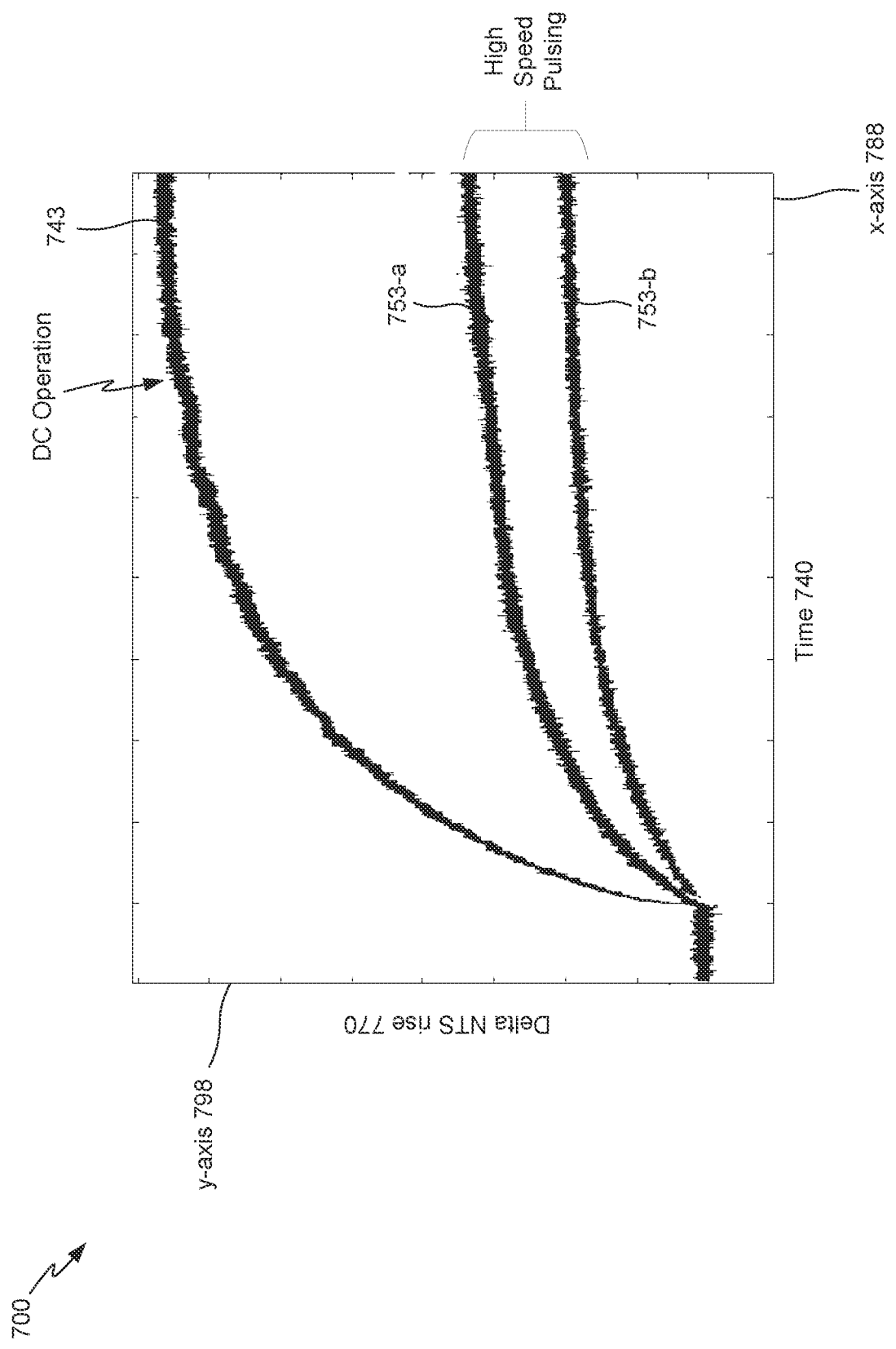
FIG. 7 illustrates a conceptual graph showing a response of a nearfield transducer (NFT) temperature sensor or NTS when a LD is preheated using DLH-pulse bias, according to various aspects of the disclosure.

FIG. 7 shows a hardware measurement graph 700 showing a response of a NFT temperature sensor (NTS) when a LD is heated using a DC bias (trace 743) and when the LD is heated using DLH-pulse bias (traces 753-*a* and 753-*b*), according to various aspects of the disclosure. In FIG. 7, delta NTS rise 770 is shown on the vertical or y-axis 798, while time 740 is showing along the horizontal or x-axis 788. As described in relation to FIGS. 1B and 1C, the NTS is a nearfield transducer (NFT) temperature sensor positioned at or near the output of the laser and configured to measure a rise in temperature when a bias is applied to the laser diode.

Specifically, the output of the NTS corresponds to a temperature that is related to the power that is delivered at the output of the laser. FIG. 7 depicts a plurality of traces, where trace 743 corresponds to the delta NTS rise when the LD is DC biased. As seen, the delta NTS rises over time when a DC bias is applied to the LD. However, applying a DC bias can also result in an optical output from the LD, which leads to data erasure/overwrite/degradation of data previously written to the disk. FIG. 7 also depicts traces 753-*a* and 753-*b*, which correspond to the delta NTS rise associated with the high-speed pulsing techniques described herein. As seen, the DLH-pulse bias also results in a temperature rise. In contrast to the DC bias, the DLH-pulse bias does not create an optical output from the laser diode.

In some embodiments, the width of the forward bias pulses applied to the laser diode may be on the order of a few nanoseconds (e.g., ~1 ns, anywhere between 2-10 ns, to name a few non-limiting examples), in which case a high bandwidth (BW) interconnect may be needed. Such a design can facilitate a high-speed laser diode path to the write process. In one non-limiting example, the selected bandwidth may be at least 1 GHz, although other bandwidths are contemplated in different embodiments. For example, in some cases, the bandwidth may be at or above 2 GHz, at least 3 GHz, etc. In the example graph shown in FIG. 7, trace 753-*a* corresponds to a higher frequency and power DLH pulse signal, while trace 753-*b* corresponds to a lower frequency and power DLH pulse signal.

Thus, as described above, preheating the LD to a temperature that is at or near the target temperature using the disclosed DLH techniques may serve to prevent or reduce mode hops during certain HAMR drive operations (e.g., at the start of a write operation), which can help enhance HAMR recording performance as compared to the prior art.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or SoC (e.g., SoC 101 in FIG. 1B). In addition, control circuitry 22 may include a preamp circuit implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., method 80 shown in FIG. 2C) described herein. The instructions may be stored in any computer-readable medium. In some examples, they may be stored on a non-volatile semiconductor memory device, component, or system external to the microprocessor, or integrated with the microprocessor in the SoC 101. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks (e.g., method 80) may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute control circuitry 22 as described herein and may perform one or more of the functions of control circuitry 22 as described herein. In various examples, control circuitry 22, or another processing device performing one or more of the functions of control circuitry as described herein, may be abstracted away from being physically proximate to the disks and disk surfaces. The control circuitry, or another processing device performing one or more of the functions of control circuitry as described herein, may be part of or proximate to a rack of or a unitary product comprising multiple data storage devices, may be part of or proximate to one or more physical or virtual servers, may be part of or proximate to one or more local area networks or one or more storage area networks, may be part of or proximate to a data center, or may be hosted in one or more cloud services.

In various examples, a disk drive, such as disk drive 15, may include a magnetic disk drive, an optical disk drive, a hybrid disk drive, or other types of disk drives. In addition, some examples may include electronic devices such as computing devices, data server devices, media content storage devices, or other devices, components, or systems that may comprise the storage media and/or control circuitry described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are not limited to any particular sequence, and the blocks or states relating thereto can be performed in other sequences. For example, tasks or events may be performed in an order other than that specifically disclosed, or multiple tasks or events may be combined in a single block or state. The tasks or events may be performed in serial, in parallel, or in another manner. Tasks or events may be added to or removed from the disclosed examples. The systems and components described herein may be configured differently than described. For example, elements may be added to, removed from, or rearranged compared to the disclosed examples.

While certain embodiments are described herein, these embodiments are presented by way of example only, and do not limit the scope of this disclosure. Nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of this disclosure.

Method 80 and other methods of this disclosure may include other steps or variations in various other embodiments. Some or all of method 80 may be performed by or embodied in hardware, or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for dark laser heating or DLH by positive pulse biasing, for instance, to preheat a laser diode to a target or steady-state temperature in a data storage device configured for heat-assisted magnetic recording (HAMR). Those of skill in the art will be well-equipped by this disclosure with an understanding and an informed reduction to practice of a wide panoply of further applications, architectures, techniques, and methods for dark laser heating by positive pulse biasing in a HAMR drive, and other aspects of this disclosure encompassed by the present disclosure and by the claims set forth below.

As used herein, the recitation of "at least one of A, B and C" is intended to mean "either A, B, C or any combination of A, B and C." The disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of changes in the form, construction, and arrangement of components as described herein.

While this disclosure has been described with reference to various examples, these examples are illustrative, and the scope of the disclosure is not so limited. The subject matter described herein is presented in the form of illustrative, non-limiting examples, and not as exclusive implementations, whether or not they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently or described with different terminology, without departing from the spirit and scope of this disclosure and the following claims. These and other variations, modifications, additions, and improvements may fall within the scope of this disclosure as defined in the following claims.

The invention claimed is:

1. A data storage device comprising:
   a disk;
   a read/write head configured to read data from and write data to the disk;
   a laser diode configured to heat an area of the disk near the read/write head; and
   one or more processing devices configured to:
      preheat the laser diode to a target temperature associated with a write operation, wherein the preheating comprises:
         applying at least one forward bias pulse to the laser diode, wherein a corresponding duration of the at least one forward bias pulse is shorter than a duration of a turn-on delay for the laser diode; and
      initiate a write operation for writing data to the disk, based at least in part on the preheating.

2. The data storage device of claim 1, wherein a corresponding bias current associated with the at least one forward bias pulse is above a lasing threshold current, and wherein the laser diode is in a non-lasing state when the at least one forward bias pulse is applied to preheat the laser diode.

3. The data storage device of claim 1, wherein applying the at least one forward bias pulse comprises applying a plurality of forward bias pulses, and wherein a corresponding duration of each of the plurality of forward bias pulses is shorter than the duration of the turn-on delay for the laser diode.

4. The data storage device of claim 1, wherein the one or more processing devices are further configured to preheat the laser diode by dark laser heating (DLH).

5. The data storage device of claim 1, wherein the turn-on delay corresponds to a time delay between when the at least one forward bias pulse is applied to the laser diode and when the laser diode produces an optical response.

6. The data storage device of claim 5, wherein no optical response is produced by the laser diode when a corresponding duration of the at least one forward bias pulse is shorter than the duration of the turn-on delay.

7. The data storage device of claim 1, wherein the turn-on delay is in a range from about 1 ns to about 10 ns.

8. The data storage device of claim 1, wherein, the turn-on delay is based at least in part on an amount of pre-bias applied to the laser diode prior to the write operation, and wherein a bias current associated with the pre-bias is below a lasing threshold current.

9. The data storage device of claim 8, wherein the laser diode is configured to produce an optical response when the bias current is at or above the lasing threshold current.

10. The data storage device of claim 1, wherein the turn-on delay is based at least in part on a peak laser current, a pre-bias current, a recombination time ($\tau$), and a lasing threshold current.

11. The data storage device of claim 10, wherein the peak laser current is based at least in part on the target temperature, and wherein the target temperature corresponds to a steady-state temperature associated with the write operation.

12. The data storage device of claim 1, wherein the one or more processing devices further comprise a preamplifier integrated circuit (IC), and wherein the preamplifier IC is used to perform the applying of the at least one forward bias pulse to the laser diode.

13. A method for operating a data storage device configured for heat-assisted magnetic recording using a laser diode, the method comprising:
    preheating the laser diode to a target temperature associated with a write operation, wherein the preheating comprises:
        applying at least one forward bias pulse to the laser diode, wherein a corresponding duration of the at least one forward bias pulse is shorter than a duration of a turn-on delay for the laser diode; and
    initiating, based at least in part on the preheating, the write operation for writing data to a disk of the data storage device.

14. The method of claim 13, wherein the laser diode is preheated using dark laser heating (DLH), and wherein a corresponding bias current associated with the at least one forward bias pulse is above a lasing threshold current, and wherein the laser diode is in a non-lasing state when the at least one forward bias pulse is applied to preheat the laser diode.

15. The method of claim 13, wherein applying the at least one forward bias pulse comprises applying a plurality of forward bias pulses, and wherein a corresponding duration of each of the plurality of forward bias pulses is shorter than the duration of the turn-on delay for the laser diode.

16. The method of claim 13, wherein the turn-on delay corresponds to a time delay between when the at least one forward bias pulse is applied to the laser diode and when the laser diode produces an optical response.

17. The method of claim 13, wherein no optical response is produced by the laser diode when a corresponding duration of the at least one forward bias pulse is shorter than the duration of the turn-on delay.

18. The method of claim 13, wherein the turn-on delay is based at least in part on an amount of pre-bias applied to the laser diode prior to the write operation, and wherein a bias current associated with the pre-bias is below a lasing threshold current, and wherein the laser diode is configured to produce an optical response when an applied bias current is at or above the lasing threshold current.

19. The method of claim 13, wherein the turn-on delay is based at least in part on a peak laser current, a pre-bias current, a recombination time ($\tau$), and a lasing threshold current, and wherein the peak laser current is based at least in part on the target temperature, the target temperature corresponding to a steady-state temperature associated with the write operation.

20. One or processing devices comprising:
    means for preheating a laser diode of a data storage device configured for heat-assisted magnetic recording using the laser diode, wherein the means for preheating comprises:
        means for applying at least one forward bias pulse to the laser diode to preheat the laser diode to a target temperature associated with a write operation, wherein a corresponding duration of the at least one forward bias pulse is shorter than a duration of a turn-on delay for the laser diode; and
    means for initiating the write operation for writing data to a disk of the data storage device, based at least in part on the preheating.

* * * * *